Aug. 4, 1953

G. C. WELCH 2,647,324

SURFACE TEST INDICATOR

Original Filed Oct. 5, 1949

INVENTOR
GERALD C. WELCH

BY  J. P. Keiper

ATTORNEY

Patented Aug. 4, 1953

2,647,324

UNITED STATES PATENT OFFICE 2,647,324

SURFACE TEST INDICATOR

Gerald C. Welch, Rochester, N. Y.

Original application October 5, 1949, Serial No. 119,626. Divided and this application June 17, 1952, Serial No. 293,884

3 Claims. (Cl. 33—172)

This invention relates to surface test indicators, and more particularly to contact elements therefor.

In test indicators of the type disclosed in copending applications Serial No. 119,626, filed October 5, 1949, and Serial No. 245,054, filed September 4, 1951, now Patent 2,621,413, granted December 16, 1952, it is desirable to provide a contact element that is adapted for internal as well as external usage, and provide an element of sufficient size as to be able to withstand ordinary wear, as well as small enough to project into small bores. At the same time, the contact region of such element should at all times bear a given relation with respect to the pivot point of such element in the gage proper, in order that accurate indications may be had.

The present invention is a division of application Serial No. 119,626, aforesaid, and is directed to a contact element construction in which contact elements of different diameters are provided, the smaller of which, when not in use, may be protected by the larger, and in which either element bears a common relation to the pivot point of the contact element.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a plan view of a test indicator having the contact element of the invention applied thereto;

Figure 2 is a top plan view of the indicator with the cover plate removed therefrom;

Figure 3 is a longitudinal section of the indicator of Figure 1, taken substantially on the line 3—3 of Figure 1; and Figure 4 is an enlarged sectional view of the contact element, also taken on the line 3—3 of Figure 1.

In the drawings, reference numeral 1 indicates the lower part of the housing and reference numeral 2 indicates the upper part of the housing or the cover plate therefor. 3 indicates the dial plate, which is supported in an intermediate position inside of the housing. This dial plate has the graduations 4 on each side of it. The cover plate is perforated in two places indicated at 5 and 6, and is held on the lower part of the housing by means of the screws or studs 7 and 8. Pivotally mounted on the stud 7 is the operating arm 9 shown in Figures 2 and 3. A bifurcated pointer 10 is provided, which is pivoted on the stud 8. On this pointer 10 are two studs 11 and 12, adapted to be engaged by projections 13 and 14 by which the pointer 10 is moved in an indicating direction upon movement of the arm 9 in either direction. The pointer 10 is normally held in zero position by the spring 15, which is fastened to the lower part of the housing in any suitable way and pressed against the stud 11. Between the spring and the projections 13 and 14, the pointer is held normally in the zero position.

The pointer 10 is bifurcated and has two hands, one of which 10a swings above the dial plate 3, and the other hand 10b swings below the dial plate 3.

The lower part of the housing 1 has an annular rim 22 with an inwardly extending flange 23 on the bottom thereof, which rim and flange serves as a seat for the crystal 24.

The cover plate 2 is triangular in shape at the left as shown in Figures 1 and 2, and, as shown in Figure 3, has an annular rim 28 to the right fitted with a crystal 29.

The operating arm 9 extends to the left of the stud 7 on which it is pivoted. Also pivoted on stud 7 is the contact element 36, which is recessed to receive the left hand end of the arm 9 as at 35. On the outer end of the contact element 36 is the threaded stem 37 with a male thread 31 thereon. The stem has a reduced diameter extension 32 terminating in the ball contact tip 38. The step extension and the ball contact tip are very small in diameter, and are intended to engage in very small holes, or fine work.

On the outside of the threaded stem 37 is engaged a threaded sleeve 40 having a female thread on the inside thereof. On the end of this sleeve is a large ball contact tip 41 that is intended to engage in large bores, or upon coarse work. This large ball contact tip is normally in place on the small tip and protects the small tip, but when it is desired to use the small tip, the large tip can be removed, and this will expose the small tip for use.

The root diameter of the threads on stem 37 is approximately that of the ball contact tip 38, whereby the large ball contact, with its internally threaded sleeve 40 may freely pass over the tip 38 and be threaded in place, with its end 43 in abutting relation to the shoulder 44. The axial distance from the shoulder 44 to the center of the small ball tip is preferably substantially the same as the distance from the abutment 43 to the center of the tip 41, so that indications of the gage will be approximately the same, regardless of the tip employed.

The arm 9 is frictionally gripped between the bifurcated end 35 of the element 36, whereby the element may be angularly disposed in various positions with relation to the arm 9, the friction, however, being sufficient to transmit movement of the element to the arm 9, to actuate the indicator.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a ball tip for a dial indicator, a contact tip comprising a threaded shank, and an end ball of a diameter approximately the root diameter of the threads on said shank, a ball ended sleeve having internal threads for engaging said threaded shank, said ball ended sleeve having an end shoulder, and said shank having a shoulder at the base of said threads, the axial distance between the center of the ball of said sleeve and said shoulder thereon, and the axial distance between the end ball and shank shoulder being substantially the same, whereby when said ball sleeve is threaded upon said ball and shank, the center of said sleeve ball coincides with the center of said shank ball.

2. In a contact member for a dial indicator, a frame, a bifurcated member pivoted in said frame, an indicating arm having an end frictionally and pivotally positioned within said bifurcated end, a threaded shank formed on said member, terminating in a reduced diameter stem portion and contact ball of a diameter not greater than the root diameter of the threads of said threaded shank, and an internally threaded sleeve adapted to be threaded on said shank and having a cavity to receive said contact ball, said sleeve having at its outer end a second contact ball, and means providing a limit for limiting the extent said sleeve may be threaded upon said shank, said limit being adapted to center said second contact ball concentrically with the first-named contact ball.

3. In a ball tip for a dial indicator, a contact tip comprising a member having a shank adapted to receive a protecting sleeve, said shank having a shoulder at one end for engaging an end of said sleeve when positioned over said shank for establishing an end position of the sleeve with respect to the shank, a reduced diameter stem projecting from the other end of said shank terminating in a ball of a diameter less than any shank cross-sectional dimension, said sleeve at its other end terminating in a hollow ball tip adapted to be substantially concentrically located with respect to the first-named ball when said sleeve is in protecting position and in the said end position with respect to said shank, and means for frictionally securing said sleeve on said shank.

GERALD C. WELCH.

No references cited.